United States Patent
Isojima et al.

(10) Patent No.: US 9,762,051 B2
(45) Date of Patent: Sep. 12, 2017

(54) CURRENT-LIMITING AND POWER-FLOW CONTROL DEVICE

(71) Applicant: SUMITOMO ELECTRIC INDUSTRIES, LTD., Osaka-shi, Osaka (JP)

(72) Inventors: Shigeki Isojima, Osaka (JP); Shuichi Nogawa, Osaka (JP); Kouji Noguchi, Kyoto (JP); Kazuhiro Kuroda, Kyoto (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/770,998

(22) PCT Filed: Mar. 26, 2014

(86) PCT No.: PCT/JP2014/058535
§ 371 (c)(1),
(2) Date: Aug. 27, 2015

(87) PCT Pub. No.: WO2014/162949
PCT Pub. Date: Oct. 9, 2014

(65) Prior Publication Data
US 2016/0020604 A1    Jan. 21, 2016

(30) Foreign Application Priority Data
Apr. 1, 2013 (JP) .................................. 2013-075938

(51) Int. Cl.
*H02H 7/00* (2006.01)
*H02H 9/02* (2006.01)
*H02H 3/08* (2006.01)

(52) U.S. Cl.
CPC .............. *H02H 9/023* (2013.01); *H02H 3/08* (2013.01); *H02H 9/021* (2013.01); *Y02E 40/68* (2013.01); *Y02E 40/69* (2013.01)

(58) Field of Classification Search
CPC ........... H02H 9/023; H02H 3/08; Y02E 40/69
(Continued)

(56) References Cited

U.S. PATENT DOCUMENTS 3,629,690 A * 12/1971 Massar ..................... H01F 6/02
327/527
2008/0043382 A1 2/2008 Lee et al.
(Continued)

FOREIGN PATENT DOCUMENTS

CN 101127440 2/2008
CN 101183129 5/2008
(Continued)

OTHER PUBLICATIONS

U.S. Appl. No. 14/770,953, filed Aug. 27, 2015, Sumitomo Electric Ind Ltd.
(Continued)

*Primary Examiner* — Danny Nguyen
(74) *Attorney, Agent, or Firm* — Drinker Biddle & Reath LLP

(57) ABSTRACT

A current-limiting and power-flow control device according to the present invention includes a superconducting current-limiting element including a superconductor, a series capacitor, and a parallel circuit. The series capacitor is connected in series with the superconducting current-limiting element. The parallel circuit includes a reactor connected in parallel with a series circuit including the superconducting current-limiting element and the series capacitor. Accordingly, overcurrent at the time of occurrence of a fault causes transition of the superconductor of the superconducting current-limit-
(Continued)

ing element to the normal conducting state, and thus causes autonomous current-limiting operation of the superconducting current-limiting element. Thus, application of an excessive load across the terminals of the series capacitor due to the aforementioned fault can surely be prevented. Accordingly, unlike the conventional device, it is unnecessary to install an arrester for protection of the series capacitor and the configuration of the current-limiting and power-flow control device can be simplified.

4 Claims, 3 Drawing Sheets

(58) Field of Classification Search
USPC .................................................. 361/93.9, 19
See application file for complete search history.

(56) References Cited

U.S. PATENT DOCUMENTS

| | | | | |
|---|---|---|---|---|
| 2008/0056327 | A1* | 3/2008 | Gerritsen | F27D 11/10 373/102 |
| 2009/0052097 | A1 | 2/2009 | Hyun et al. | |

FOREIGN PATENT DOCUMENTS

| | | | | |
|---|---|---|---|---|
| CN | 101373895 | | 2/2009 | |
| CN | 102035196 | A * | 4/2011 | |
| CN | 102646968 | A * | 8/2012 | H02H 9/021 |
| DE | 19963181 | | 7/2001 | |
| JP | 2-101926 | | 4/1990 | |
| JP | 2-116184 | | 4/1990 | |
| JP | 2-202320 | | 8/1990 | |
| JP | H03-245725 | A | 11/1991 | |
| JP | H04-207924 | A | 7/1992 | |
| JP | 7-209371 | | 8/1995 | |
| JP | 9-074682 | | 3/1997 | |
| JP | H09-130966 | A | 5/1997 | |
| JP | H11-146555 | A | 5/1999 | |
| JP | 2000-090788 | A | 3/2000 | |
| JP | 2001-078362 | | 3/2001 | |
| JP | 2004-350337 | A | 12/2004 | |
| JP | 2007-236108 | A | 9/2007 | |
| JP | 2008-048588 | | 2/2008 | |
| JP | 2010017016 | A * | 1/2010 | |

OTHER PUBLICATIONS

Yuji Yamazaki et al., "Development of TCSC Application to Fault Current Limiters", IEEJ Transations on Power and Energy, the Institute of Electrical Engineers of Japan, vol. 121 (2001), No. 4, pp. 514-519.
Hans-Peter Kraemer et al., "Superconducting Fault Current Limiter for Transmission Voltage," Physics Procedia 36 (2012) 921-926.
Kejun Li, "Studies on Dynamic Simulation and Control Strategies of the Thyristor Controlled Series Compensation (TCSC)", Chinese Doctoral Dissertations & Master's Theses Full-Text Database: Engineering Science and Technology II, Jul. 15, 2006, pp. 18-20, 32, with English-language translation of relevant portion attached.
U.S. Office Action dated Jun. 6, 2017 that issued in U.S. Appl. No. 14/770,953 attached.

* cited by examiner

FAULT CURRENT
(PASSING CURRENT
IN CURRENT LIMITER)

VOLTAGE ACROSS
TERMINALS OF
CAPACITOR

CURRENT-LIMITING
RESISTANCE

… (1)

CURRENT-LIMITING AND POWER-FLOW CONTROL DEVICE

TECHNICAL FIELD

The present invention relates to a current-limiting and power-flow control device, and more specifically relates to a current-limiting and power-flow control device in which a superconductor is used.

BACKGROUND ART

A parallel LC type power-flow control device installed in an electric power system has been known. In some cases, operation of such a power-flow control device may be accompanied by an increase of the short-circuit capacity of the system having its impedance compensated for by the effect of insertion of a capacitor. In the case where the power-flow control device is applied to such a system having a large short-circuit capacity, it is desirable to equip the device with a current-limiting function for addressing a short-circuit fault in addition to power-flow control, to thereby address the short-circuit current. As one of such devices, a device (current-limiting and power-flow control device) has been proposed in which a current-limiting reactor is connected in series with a thyristor control series capacitor (TCSC) so as to equip the device with the current-limiting function (see for example Yuji Yamazaki et al., "Development of TCSC Application to Fault Current Limiters," IEEJ Transactions on Power and Energy, the Institute of Electrical Engineers of Japan, Vol. 121 (2001), No. 4, pp. 514-519 (NPD 1)).

CITATION LIST

Non Patent Document

NPD 1: Yuji Yamazaki et al., "Development of TCSC Application to Fault Current Limiters," IEEJ Transactions on Power and Energy, the Institute of Electrical Engineers of Japan, Vol. 121 (2001), No. 4, pp. 514-519

SUMMARY OF INVENTION

Technical Problem

When the aforementioned conventional current-limiting and power-flow control device performs a current-limiting operation, however, a delay occurs before the thyristor switch is fully turned on, because of a time delay in the case where fault current is detected by a control circuit. It has therefore been necessary to install a protection device such as arrester in order to protect the capacitor of the TCSC. Installation of such an arrester complicates the device configuration of the current-limiting and power-flow control device, which causes an increase in cost. Further, because it takes a certain time for the arrester to recover, the TCSC has to be bypassed during this time, which may result in a restriction such as restriction on the transmission power of a power transmission line on which the device is installed.

The present invention has been made to solve the above-described problems, and an object of the present invention is to provide a current-limiting and power-flow control device having no complicated device configuration and having less restrictions in terms of control.

Solution to Problem

A current-limiting and power-flow control device according to the present invention is a current-limiting and power-flow control device in which a superconductor is used and which includes a superconducting current-limiting element including the superconductor, a capacitor, and a parallel circuit. The capacitor is connected in series with the superconducting current-limiting element. The parallel circuit includes a reactor connected in parallel with a series circuit including the superconducting current-limiting element and the capacitor.

Accordingly, overcurrent (short-circuit current) at the time of occurrence of a fault causes transition of the superconductor of the superconducting current-limiting element to a normal conducting state and thereby causes the superconducting current-limiting element to automatically perform a current-limiting operation. Thus, an excessively large load (excessively large voltage) due to the fault can surely be prevented from being applied across the terminals of the capacitor. It is therefore unnecessary, unlike the conventional device, to install an arrester for the sake of capacitor protection, and the configuration of the current-limiting and power-flow control device can be simplified. Further, because the arrester like that of the conventional device is not used, there is no restriction in terms of control due to the recovery time of the arrester. Further, because overcurrent causes automatic transition of the superconducting current-limiting element to the normal conducting state, a reliable current-limiting operation can be carried out.

Advantageous Effects of Invention

In accordance with the present invention, a current-limiting and power-flow control device having no complicated device configuration and having less restrictions in terms of control can be provided.

DESCRIPTION OF EMBODIMENTS

Figure 1:
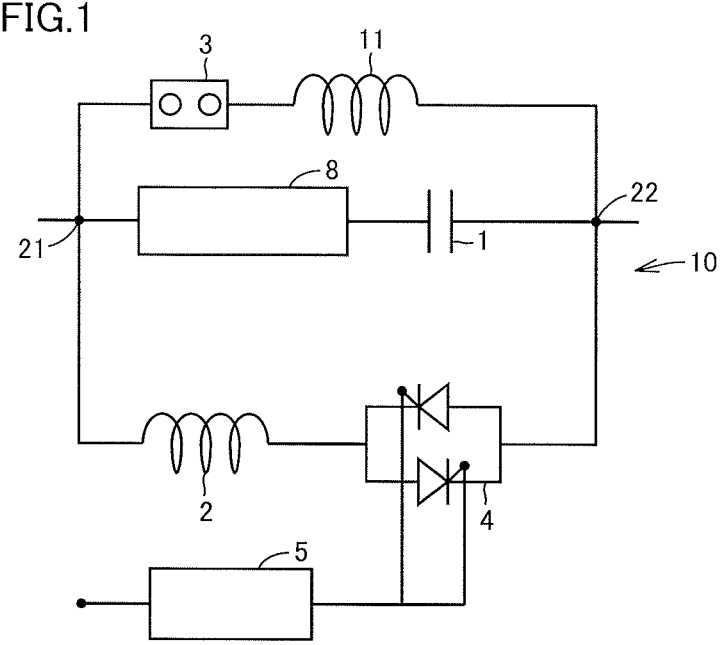
FIG. 1 is a circuit diagram for illustrating a first embodiment of the current-limiting and power-flow control device according to the present invention.

Embodiments of the present invention will hereinafter be described based on the drawings. In the following drawings, the same or corresponding parts are denoted by the same reference numerals, and a description thereof will not be repeated.

First Embodiment

Referring to FIG. 1, a current-limiting and power-flow control device of the present invention will be described. Current-limiting and power-flow control device 10 of the present invention includes a series capacitor 1, a superconducting current-limiting element 8, reactors 2, 11, a bypass switch 3, a thyristor switch 4, and a control circuit 5.

Superconducting current-limiting element 8 is connected with capacitor 1. A parallel circuit including thyristor switch 4 and reactor 2 is formed so that the parallel circuit is connected in parallel with a series circuit made up of series capacitor 1 and superconducting current-limiting element 8. This parallel circuit is connected, at connection points 21, 22, with the aforementioned series circuit made up of superconducting current-limiting element 8 and series capacitor 1. In the parallel circuit, thyristor switch 4 is connected in series with reactor 2. To thyristor switch 4, control circuit 5 is connected. Another parallel circuit including bypass switch 3 and reactor 11 is formed so that this parallel circuit is connected in parallel with the aforementioned series circuit. The other parallel circuit is connected, at connection points 21, 22, with the series circuit made up of superconducting current-limiting element 8 and series capacitor 1. In the other parallel circuit, bypass switch 3 is connected in series with reactor 11. Bypass switch 3 is provided for bypassing superconducting current-limiting element 8 for example when the device is inspected.

Next, an operation of current-limiting and power-flow control device 10 shown in FIG. 1 will be described. When a normal operation is done, the superconductor included in superconducting current-limiting element 8 is kept in a superconducting state. Thus, series capacitor 1, reactor 2, and thyristor switch 4 form a TCSC. For this TCSC, the control angle can be changed to thereby change its impedance characteristic almost continuously from a capacitive one to an inductive one. Thus, the impedance characteristic of the TCSC can be adjusted to thereby control the power flow of an electric power system to which current-limiting and power-flow control device 10 is connected.

In the case where a fault (short-circuit fault for example) occurs in the electric power system to which current-limiting and power-flow control device 10 is connected, overcurrent due to the fault causes transition of superconducting current-limiting element 8 to a normal conducting state. As a result, superconducting current-limiting element 8 automatically performs a current-limiting operation. Thyristor switch 4 can be turned on to cause current flowing in superconducting current-limiting element 8 to flow in the parallel circuit which includes reactor 2. As a result, reactor 2 functions as a current-limiting reactor and recovery of superconducting current-limiting element 8 to the superconducting state can be ensured. Further, because it is unnecessary to separately install a protection device (arrester for example) for the sake of protection of series capacitor 1, the configuration of current-limiting and power-flow control device can be simplified and restrictions in terms of control due to the arrester or the like can be eliminated.

Regarding current-limiting and power-flow control device 10 shown in FIG. 1, in the case where excessively large current flows in current-limiting and power-flow control device 10 due to a fault or the like in the electric power system in which current-limiting and power-flow control device 10 is installed, superconducting current-limiting element 8 is quenched to immediately and automatically perform a current-limiting operation. Therefore, an overvoltage can surely be prevented from being applied across the terminals of series capacitor 1. After this current-limiting operation, the parallel circuit including thyristor switch 4 causes current to flow while bypassing superconducting current-limiting element 8. Thus, the impedance (current-limiting impedance) at reactor 2 limits the overcurrent, and the process thermal energy generated at superconducting current-limiting element 8 can be reduced. As a result, quick recovery of superconducting current-limiting element 8 can be made.

Second Embodiment

Figure 2:
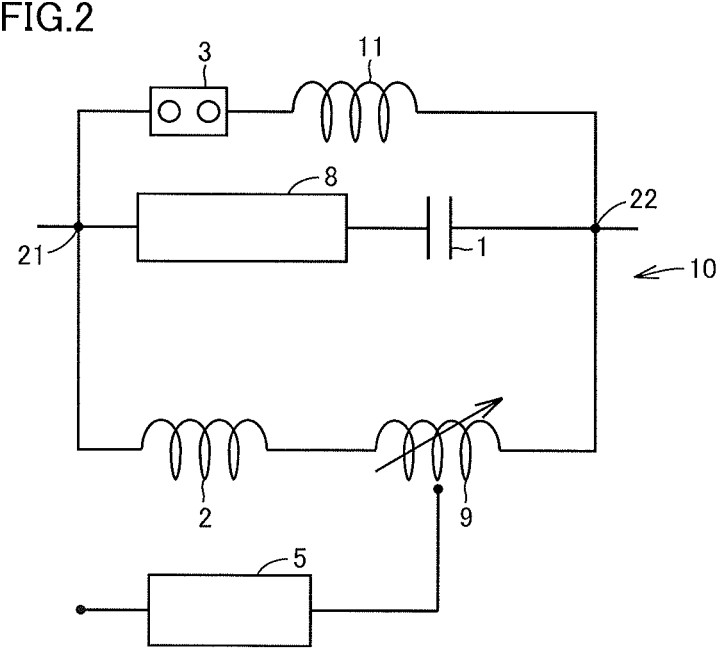
FIG. 2 is a circuit diagram for illustrating a second embodiment of the current-limiting and power-flow control device according to the present invention.

Referring to FIG. 2, a second embodiment of the current-limiting and power-flow control device of the present invention will be described.

Referring to FIG. 2, while current-limiting and power-flow control device 10 basically has a structure similar to that of current-limiting and power-flow control device 10 shown in FIG. 1, the configuration of the parallel circuit is different from that of current-limiting and power-flow control device 10 shown in FIG. 1. Namely, in current-limiting and power-flow control device 10 shown in FIG. 2, thyristor switch 4 is not placed in the parallel circuit. Instead, a reactor 2 and a tapped reactor 9 are connected in series with each other in this parallel circuit. To tapped reactor 9, control circuit 5 is connected. Like current-limiting and power-flow control device 10 shown in FIG. 1, current-limiting and power-flow control device 10 having such a structure also enables an overvoltage across the terminals of series capacitor 1 to be suppressed and enables simplification of the configuration of current-limiting and power-flow control device 10 to thereby eliminate restrictions in terms of control due to the arrester or the like.

It should be noted that current-limiting and power-flow control device 10 shown in FIG. 2 has a larger inductance of the reactors of the parallel circuit that is necessary for the same power flow control as compared with the case where thyristor switch 4 shown in FIG. 1 is used, and therefore achieves a better effect of suppressing fault current relative to that of the device configuration shown in FIG. 1. Regarding tapped reactor 9 of the configuration shown in FIG. 2, the rate of change of the inductance (L) is slower as compared with thyristor switch 4 shown in FIG. 1. Therefore, in the case where there is no problem with the maintenance and/or the stability of the voltage particularly when power is transmitted through one transmission line after removal of a fault and where a decrease of the degree of compensation of the transmission line reactance during a tap operation time of tapped reactor 9 is allowed to a certain extent, current-limiting and power-flow control device 10 configured as shown in FIG. 2 may be applied.

The following are characteristic features of the present invention given one by one. A part of them, however, may overlap those of the above-described embodiments.

Current-limiting and power-flow control device 10 according to the present invention is current-limiting and power-flow control device 10 in which a superconductor is used and which includes superconducting current-limiting element 8 including the superconductor, a capacitor (series capacitor 1), and a parallel circuit. Series capacitor 1 is connected in series with superconducting current-limiting element 8. The parallel circuit includes reactor 2 connected in parallel with a series circuit which includes superconducting current-limiting element 8 and series capacitor 1.

Accordingly, overcurrent (short-circuit current) at the time of occurrence of a fault causes transition of the superconductor of superconducting current-limiting element 8 to a normal conducting state and thereby causes superconducting current-limiting element 8 to autonomously perform a current-limiting operation. Thus, an excessively large load (excessively large voltage) due to the fault can surely be prevented from being applied across the terminals of series capacitor 1. It is therefore unnecessary, unlike the conventional device, to install an arrester for the sake of protection of series capacitor 1, and the configuration of current-limiting and power-flow control device 10 can be simplified. Further, because the arrester like that of the conventional device is not used, there is no restriction in terms of control due to the recovery time of the arrester. Further, because overcurrent causes automatic transition of superconducting current-limiting element 8 to the normal conducting state, a reliable current-limiting operation can be carried out.

In current-limiting and power-flow control device 10, reactor 2 included in the parallel circuit also functions as a current-limiting reactor. In this case, when overcurrent at the time of occurrence of a fault causes superconducting current-limiting element 8 to perform a current-limiting operation and accordingly current flows into the parallel circuit which is connected in parallel with the series circuit including superconducting current-limiting element 8 and series capacitor 1, reactor 2 in this parallel circuit can perform the current-limiting operation.

In current-limiting and power-flow control device 10, the parallel circuit may include a thyristor switch 4 connected in series with reactor 2. In this case, the autonomous operation of superconducting current-limiting element 8 immediately after occurrence of a fault prevents a load from being applied to series capacitor 1, and thyristor switch 4 can be operated (fully turned on) to surely cause current flowing in superconducting current-limiting element 8 to flow into the parallel circuit. Consequently, the fault current flowing in superconducting current-limiting element 8 can be reduced and superconducting current-limiting element 8 can immediately and surely be caused to recover.

In current-limiting and power-flow control device 10, the parallel circuit may include tapped reactor 9 connected in series with reactor 2. In this case, the inductance in the parallel circuit is larger than that in the parallel circuit where thyristor switch 4 as described above is used, and therefore, the fault current can be suppressed to a greater extent relative to the case where thyristor switch 4 is used.

Example Experiment

A simulation was performed in order to confirm the effects of the present invention.

<Conditions for the Simulation>

Figure 3:
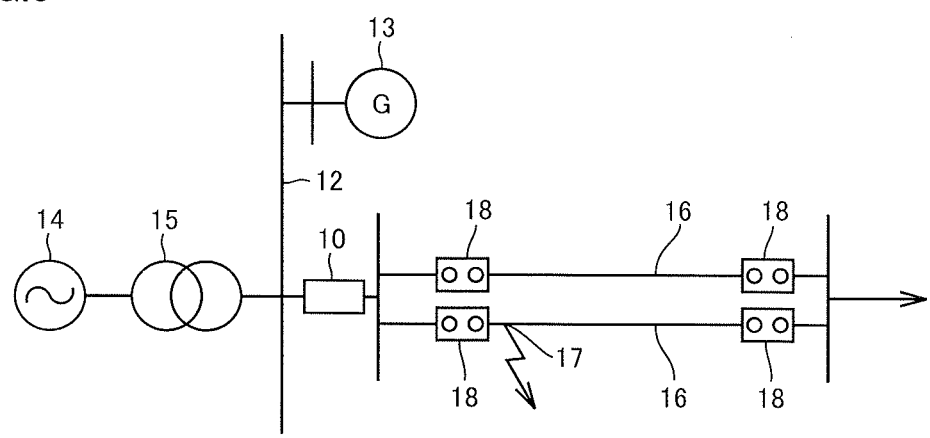
FIG. 3 is a schematic diagram showing a studied model system.

(1) As to a model system used for the simulation:

Referring to FIG. 3, a model system studied for the simulation is a system in which electric power is transmitted from a power supply 14 through a transformer 15, and it is assumed that a power supply 13 is newly installed on a secondary bus of transformer 15. The rated voltage of secondary bus 12 of the transformer was assumed to be 77 kV. It was assumed that three transformers having a rated capacity of 250 MVA were used as transformers 15. It was assumed that transformer 15 had a short-circuit impedance of 22% (based on the self capacity).

As for the condition for newly installed power supply 13, it was assumed that the power supply had a capacity of 300 MVA. It was also assumed that newly installed power supply 13 had a transient reactance Xd' of 20% (based on the self capacity).

Current-limiting and power-flow control device 10 is installed on a power transmission end of a line extending from bus 12 to a power transmission line 16. Namely, bus 12 and power transmission line 16 including two lines are connected to each other through current-limiting and power-flow control device 10.

At the opposite ends of power transmission line 16, breakers 18 are installed respectively. It was assumed that the reactance of each power transmission line 16 was an impedance L=1 mH/km, and the R component and the C component were ignored. It was further assumed that each transmission line 16 had a length of 50 km and an applied frequency of 60 Hz.

It was assumed that the model system shown in FIG. 3 had short-circuit current exceeding a rated breaking current of 31.5 kA of the breaker unless current-limiting and power-flow control device 10 was installed, as described later herein. Supposing that the backward impedance of the system determined from the short-circuit impedance of transformer 15 is 29.33%@1000 MVA and the transient reactance of newly installed power supply 13 is 66.7%@1000 MVA the combined impedance of newly installed power supply 13 and the backward system is 20.4%@1000 MVA. In this system, short-circuit current Is when three-phase short circuit occurs near the end of bus 12 is 36.8 kA.

As the model system, a radial system was used which was relatively easy to study for verification of the current-limiting operation.

It was also assumed that the configuration of current-limiting and power-flow control device 10 was similar to that of current-limiting and power-flow control device 10 shown in FIG. 1. Regarding the following simulation, for the sake of easy verification of the current-limiting operation, the simulation was done under the condition that the two lines were compensated for together by current-limiting and power-flow control device 10 as shown in FIG. 3.

(2) As to the load and the transmission line power flow:

As to the power transmission capacity of power transmission line 16, it was assumed that the transmission line had a relatively large capacity among those applied as power transmission lines for 77 kV, and it was assumed that the regular capacity of one line determined by thermal conditions was 170 MW.

Regarding this simulation, it was assumed that the load cannot be changed in the radial system. In this case, if one of the lines fails, all current flows in the sound line. The maximum power transmission capacity of the two lines is therefore 170 MW.

Meanwhile, if it is assumed that the phase difference angle is 15° in terms of the stability of the power transmission line, the transmitted power as an index for the sake of the stability should be 80 MW or less (per line). Power transmission of 160 MW is therefore possible even through a single line, as long as 50% of a line reactance X1 (50 km) is compensated for.

Based on the above-described study, it was assumed that the system used for the simulation had the conditions that the power transmission capacity was increased by 50% compensation (corresponding to 25 km) of X1 (50 km) of power transmission line 16 and that the power transmitted by the two 77 kV power transmission lines was 160 MW.

(3) As to conditions for the current-limiting and power-flow control device:

Capacitive reactance Xc of series capacitor 1 of current-limiting and power-flow control device 10 and inductive reactance XL of reactor 2 thereof were studied in the following way.

It was assumed first that the reactance in a steady state was 50% compensation of the line reactance. In the two-line state, the line reactance is: line reactance $X1=\omega \times 1$ mH×50 km/two lines=9.42Ω, and the reactance based on 77 kV and 1000 MVA is: $X1=1.59$ pu. Thus, in the case of 50% compensation, reactance $X_{FCL}$ of current-limiting and power-flow control device 10 is −j0.8 pu. Further, in the case of power transmission through one line after removal of a fault, the reactance is $X_{FCL}$=−j1.6 pu so that 50% compensation of transmission line reactance X (=3.18 pu) of a single line is provided.

As to the steady-state current flowing in series capacitor 1 and reactor 2, in the case of the parallel LC type, the current flowing in series capacitor 1 and reactor 2 of current-limiting and power-flow control device 10 increases relative to the line current, which causes an increase of the device cost. In view of this, the steady-state current flowing in series capacitor 1 and reactor 2 in the case of power transmission through the two lines was set to twice or less as high as the line current.

Accordingly, for power transmission through the two lines, capacitive reactance Xc=−j0.4 pu and inductive reactance XL=j0.8 pu were used, and it was adjusted to XL=j0.53 pu in the case of power transmission through one line.

It was assumed that these conditions could be achieved for current-limiting and power-flow control device 10 shown in FIG. 1 by a fixed reactance (X) of j0.2 pu and through use in a range of 30° firing angle β≤40°, where β was an angle from a voltage peak. In this case, XL at the time when thyristor switch 4 is fully turned on is the fixed reactance (X) of j0.2 pu.

Next, inductive reactance XL of reactor 2 necessary for suppressing short-circuit current was studied. Regarding a model system as described above, the study was conducted of suppression of fault current to 30 kA or less when three-phase short circuit occurs at a fault point 17 in FIG. 3 to thereby cause the current value to become maximum. The characteristics of current-limiting and power-flow control device 10 satisfying this condition were determined in the following way. Specifically, from an inductive reactance (XL) of reactor 2 functioning as a current-limiting reactor of current-limiting and power-flow control device 10 of an example and the aforementioned combined impedance of power supply 13 and the backward system of 20.4%@1000 MVA, fault current is: Is=1/(XL+0.204)×1000000 kVA/(√3× 77 kV)≤30 kA under the condition that XL is XL≥0.046 pu. Inductive reactance XL of reactor 2 is therefore 0.046 pu or more.

Inductive reactance XL=fixed reactance X=j0.2 pu when thyristor switch 4 is fully turned on satisfies a condition of 0.046 pu or more. Namely, it is seen that the current-limiting effect when thyristor switch 4 is fully turned on is satisfactory.

Further, as a model for analyzing superconducting current-limiting element 8 in current-limiting and power-flow control device 10 shown in FIG. 1, 4.3.1 (an EMTP analysis simple model of an SN dislocation type superconducting current limiter) in Technical Report of the Institute of Electrical Engineers of Japan, No. 1088 was used. The current-limiting resistance after removal of a fault was set so that it linearly decreased from the removal of the fault to 200 ms. Then, with reference to the resistance occurrence waveform (a change with time of the generated resistance value) due to a superconducting coil for 6.6 kV 1.5 kA class quench-type current limiter, the operation time $T_{op}$ of superconducting current-limiting element 8 was assumed to be 1 ms.

Further, the current at the start of operation of superconducting current-limiting element 8 in current-limiting and power-flow control device 10 was assumed to be 4800 Arms (6.7 kAp). This value is twice as large as the steady-state current (2400 A) flowing in the superconducting current-limiting element. Further, the current-limiting resistance in the normal conducting state of superconducting current-limiting element 8 was assumed to be 8Ω.

(4) Conditions assumed for the simulation:

As for an assumed type of the fault, it was assumed that three-phase short-circuit (3LS) occurred at the fault point 17 shown in FIG. 3 (near the power-supply-side end of the bus 3LS). As for a fault sequence, it was assumed that the three-phase short circuit occurred at time T=0.3 sec, breaker 18 operates at time T=0.4 sec (both ends of the CB were opened), and the fault line was broken. It was further assumed that at time T=0.6 sec, the current limiter (superconducting current-limiting element 8) recovered to the steady state.

<Results>

Figure 4:
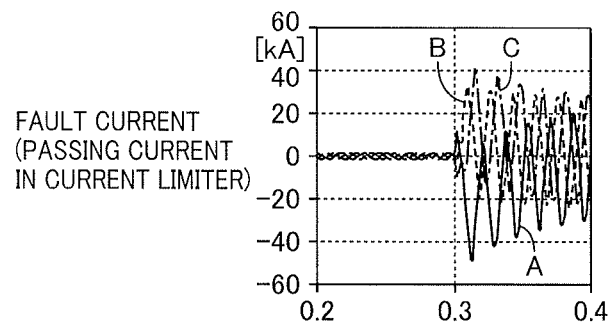
FIG. 4 is a graph showing results of a simulation regarding an example of the present invention.
Figure 5:
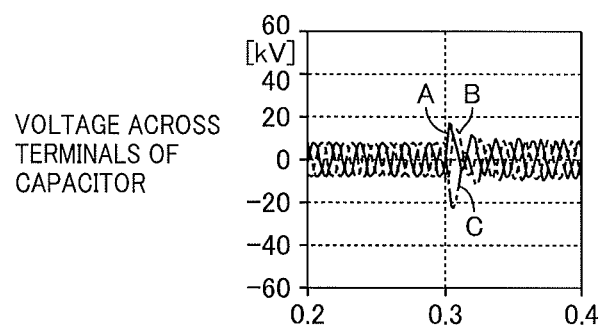
FIG. 5 is a graph showing results of a simulation regarding an example of the present invention.
Figure 6:
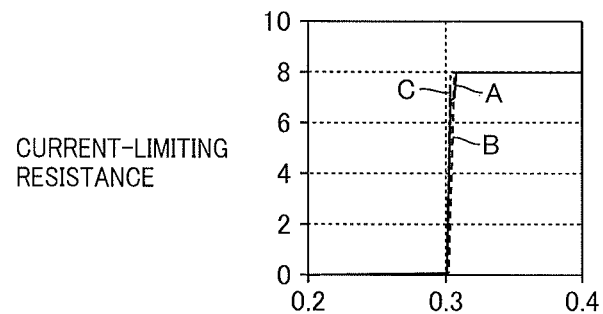
FIG. 6 is a graph showing results of a simulation regarding an example of the present invention.

FIGS. 4 to 6 show the results of a simulation to which current-limiting and power-flow control device 10 of the present invention is applied. In FIGS. 4 to 6, the horizontal axis of each graph represents time. The vertical axis of the graph in FIG. 4 represents the fault current (passing current in the current-limiting and power-flow control device), and the unit of the fault current is kA. The vertical axis in FIG. 5 represents the voltage across the terminals of the series capacitor in current-limiting and power-flow control device 10, and the unit of the voltage is kV. The vertical axis in FIG. 6 represents the current-limiting resistance, and the unit of the resistance is Ω. In the example of the present invention, as seen from FIG. 4, the AC component of the short-circuit current from which the DC component is removed is suppressed to 30 kArms (=42.4 kAp) or less and thus appropriate current limiting is achieved. In FIGS. 4 to 6, respective components of the three phases of the passing current in the current-limiting and power-flow control device are indicated as graph A, graph B, and graph C, respectively.

Further, as seen from FIG. 5, the magnitude of the voltage across the terminals of series capacitor 1 in current-limiting and power-flow control device 10 at the time of occurrence of a fault is an excessive voltage of approximately 3.2 pu at a half wave immediately after the fault, due to an influence of a slight operation delay of the current limiter for example. The voltage, however, is thereafter suppressed to substantially the same extent as the steady-state voltage.

Thus, superconducting current-limiting element 8 which exhibits an autonomous and rapid current-limiting effect is applied to current-limiting and power-flow control device 10 to thereby eliminate the need for installation of an arrester for the sake of protecting series capacitor 1 from an excessive voltage across the terminals, and also eliminate the need for a bypass switch operation for bypassing series capacitor 1 at the time of occurrence of a fault.

Regarding the above-described simulation, the case where current-limiting and power-flow control device 10 having the configuration shown in FIG. 1 was used was studied. Similar effects, however, can also be obtained from use of current-limiting and power-flow control device 10 having tapped reactor 9 as shown in FIG. 2. Specifically, it was assumed that capacitive reactance Xc of series capacitor 1, inductive reactance XL1 of reactor 2, and inductive reactance XL2 of tapped reactor 9 in current-limiting and power-flow control device 10 shown in FIG. 2 were: capacitive reactance Xc=−j0.4 pu, inductive reactance XL1=j0.53 pu, and inductive reactance XL2=0 to j0.27 pu. It should be noted that the inductive reactance in the steady state with the two lines was assumed to be XL2=j0.27 pu. At this time as well, XL=j0.8 pu and thus the condition of 0.046 pu or more is satisfied. Even a simulation using such conditions provided similar effects to the case where current-limiting and power-flow control device 10 having the structure shown in FIG. 1 is used.

It should be construed that the embodiments and examples disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is particularly advantageously applied to a current-limiting and power-flow control device including a superconducting current-limiting element.

REFERENCE SIGNS LIST

1 series capacitor; 2, 11 reactor; 3 bypass switch; 4 thyristor switch; 5 control circuit; 6 current-limiting reactor; 8 superconducting current-limiting element; 9 tapped reactor; 10, 100 current-limiting and power-flow control device; 12 substation bus; 16 power transmission line; 13 newly installed power supply; 14 power supply; 15 transformer; 17 fault point; 18 breaker; 21, 22 connection point

The invention claimed is:

1. A current-limiting and power-flow control device in which a superconductor is used, comprising:
    a superconducting current-limiting element including said superconductor;
    a capacitor connected in series with said superconducting current-limiting element; and
    a parallel circuit including a reactor connected in parallel with a series circuit including said superconducting current-limiting element and said capacitor.

2. The current-limiting and power-flow control device according to claim 1, wherein said reactor included in said parallel circuit functions as a current-limiting reactor.

3. The current-limiting and power-flow control device according to claim 1, wherein said parallel circuit includes a thyristor switch connected in series with said reactor.

4. The current-limiting and power-flow control device according to claim 1, wherein said parallel circuit includes a tapped reactor connected in series with said reactor.

* * * * *